(12) United States Patent
Reeves et al.

(10) Patent No.: US 6,292,566 B1
(45) Date of Patent: Sep. 18, 2001

(54) TELEPHONE AND ASSOCIATED METHOD FOR ROUTING A CALL

(75) Inventors: Bradley S. Reeves, Berthoud; Craig I. Weich; Lee Quintanar, both of Boulder, all of CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/201,022

(22) Filed: Nov. 30, 1998

(51) Int. Cl.[7] .................................................. H04M 11/00
(52) U.S. Cl. ............................................. 379/900; 370/352
(58) Field of Search ................................. 379/900, 93.09, 379/93.01; 370/352, 477, 460, 353, 354, 355, 356

(56) References Cited

U.S. PATENT DOCUMENTS

| | | | |
|---|---|---|---|
| 5,550,915 | * 8/1996 | Partridge, III | 379/173 X |
| 5,838,682 | * 11/1998 | Dekelbaum et al. | 379/90.01 X |
| 6,028,923 | * 2/2000 | Kolb et al. | 379/216 |
| 6,128,372 | * 10/2000 | Tsai et al. | 379/90.01 |
| 6,157,620 | * 12/2000 | Danne et al. | 379/130 X |
| 6,169,734 | * 1/2001 | Wilson | 370/352 |
| 6,169,799 | * 1/2001 | McIntosh | 379/355 |

* cited by examiner

Primary Examiner—Creighton Smith
(74) Attorney, Agent, or Firm—Brooks & Kushman P.C.

(57) ABSTRACT

A customer premise equipment device such as a telephone and an associated method for routing a call from an inbound central office are provided. The telephone comprises an audible input mechanism, an audible output mechanism, a keypad, and control logic. The keypad is used by a user to press a sequence of keys to initiate a call. The control logic responds to the pressed sequence of keys by transmitting a signal indicative of call information to the inbound central office. The keypad includes a standard telephone keypad, and further includes at least one additional key for use by the user to designate a routing method for the call.

19 Claims, 2 Drawing Sheets

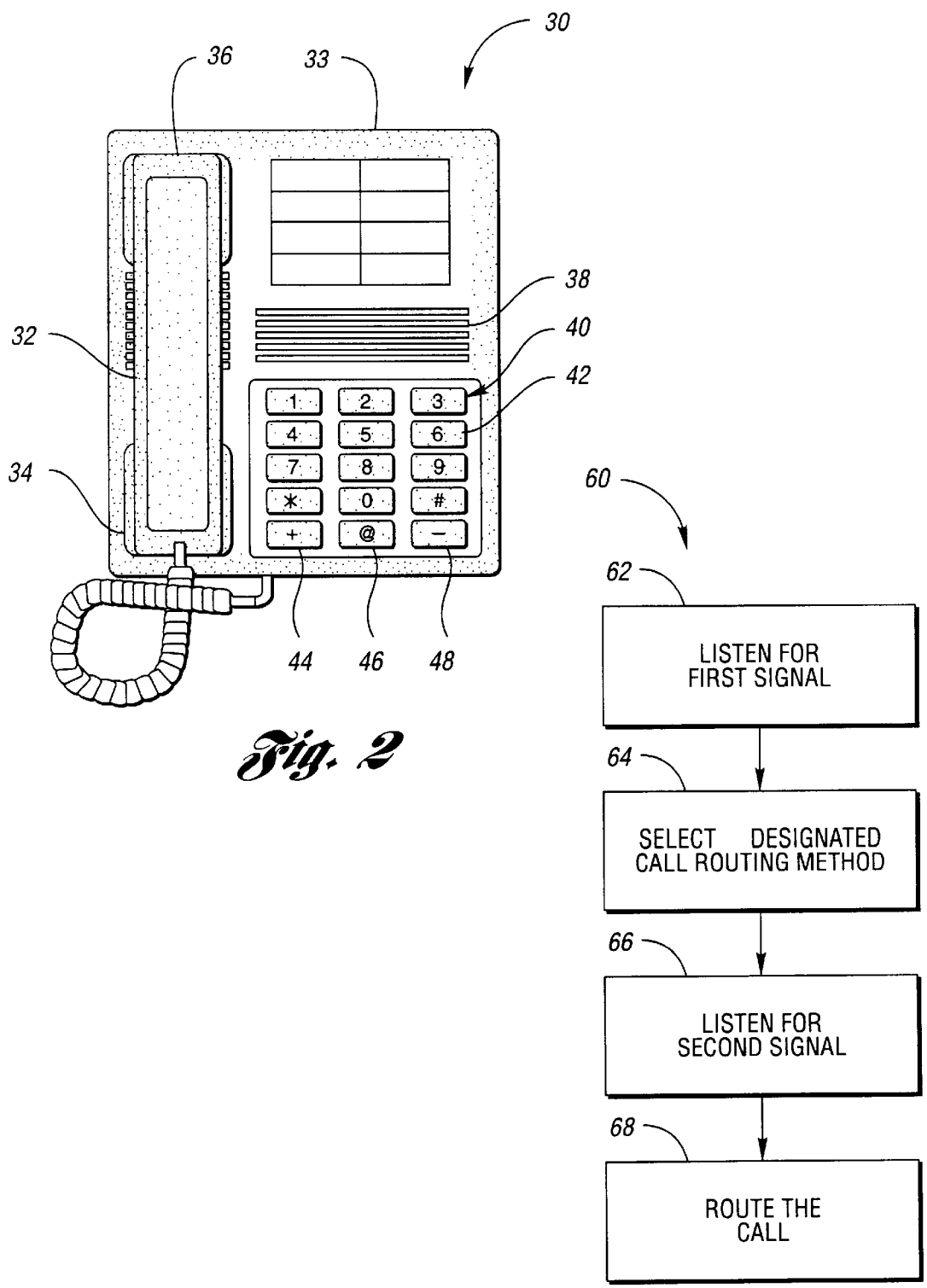

TELEPHONE AND ASSOCIATED METHOD FOR ROUTING A CALL

TECHNICAL FIELD

The present invention relates to customer premise equipment, such as telephones, and to associated methods for routing calls from an inbound central office.

BACKGROUND ART

The primary elements of an existing intelligent network are a switching system, a signaling network, a centralized database, and an operations support system which supports the database. In general, the switching system intercepts a call from a call source, and suspends call processing while launching a query through the signaling network to the centralized database. The database, in turn, retrieves the necessary information to handle the call, and returns that information through the signaling network to the network switch, which may be part of an inbound central office, so that the call can be completed. The operation support system administers the appropriate network and custom information that resides in the database.

Existing calls are either plan old telephone service (POTS) based calls that are routed through the public switched telephone network (PSTN), or are Internet protocol (IP) calls that are routed through an IP network. Currently, making an Internet phone call from a conventional phone can require a user to dial a number, and then enter an account number and password. The entering by a user of an account number and a password may, at times, becomes a hassle.

For the foregoing reasons, there is a need for a simplified method for making an Internet call from an analog telephone.

DISCLOSURE OF INVENTION

It is, therefore, an object of the present invention to provide a customer premise equipment device such as a telephone and an associated method for routing a call from an inbound central office that simplifies the process of making a packet switched call such as an Internet call from an analog telephone.

In carrying out the above object, a telephone and associated method for routing a call are provided. The telephone comprises an audible input mechanism, an audible output mechanism, a keypad, and control logic. The keypad is for use by a user to press a sequence of keys to initiate a call. The control logic responds to the pressed sequence of keys by transmitting a signal indicative of call information to an inbound central office.

The keypad includes a standard telephone keypad, which commonly consists of numbers 0 through 9, an asterisk (*), and a pound sign (#). The keypad on a telephone of the present invention further includes at least one additional key for use by the user to designate a routing method for the call.

Preferably, the at least one additional key comprises a single key for designating the routing method as packet switched routing such as Internet protocol routing. A suitable label for the at least one additional key is an @ symbol. Still further, the at least one additional key may comprise a plurality of different keys corresponding to a plurality of different routing methods.

In a preferred implementation, pressing the at least one additional key designates the call routing method as a non-default method, such as packet switched routing. In such an application, not pressing the at least one additional key designates the call routing method as a default method, such as a circuit switched or PSTN call. Preferably, the at least one additional key is pressed prior to dialing in the "ordinary" manner.

Further, in carrying out the present invention, a method for routing a call from an inbound central office is provided. The method comprises listening to a call source for a first signal indicative of a call routing method designation. The first signal is generated from pressing a non-standard key at the call source. Upon receiving the first signal, the designated call routing method for the call is selected. Of course, the absence of the first signal may designate a standard or default call routing technique. The method further comprises listening for a second signal indicative of a call destination. Upon receiving the second signal, the call is routed to the destination using the designated call routing method. Preferably, pressing the non-standard key at the call source designates the call routing method as packet switched routing such as, for example, Internet protocol.

Still further, in carrying out the present invention, a customer premise equipment device is provided. The device comprises a keypad including a key for designating a call routing method, and control logic responsive to pressing of the key. The control logic transmits a signal indicative of call information including the designated routing method to the inbound central office.

The advantages associated with embodiments of the present invention are numerous. For example, the present invention simplifies the process of making an Internet call from an analog telephone. Further, the telephone could be equipped with a set of keys that would enable the user to select from a range of call routing methods.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is a telephone made in accordance with the present invention; and

FIG. 3 is a block diagram illustrating a method of the present invention for routing a call from an inbound central office.

BEST MODE FOR CARRYING OUT THE INVENTION

Figure 1:
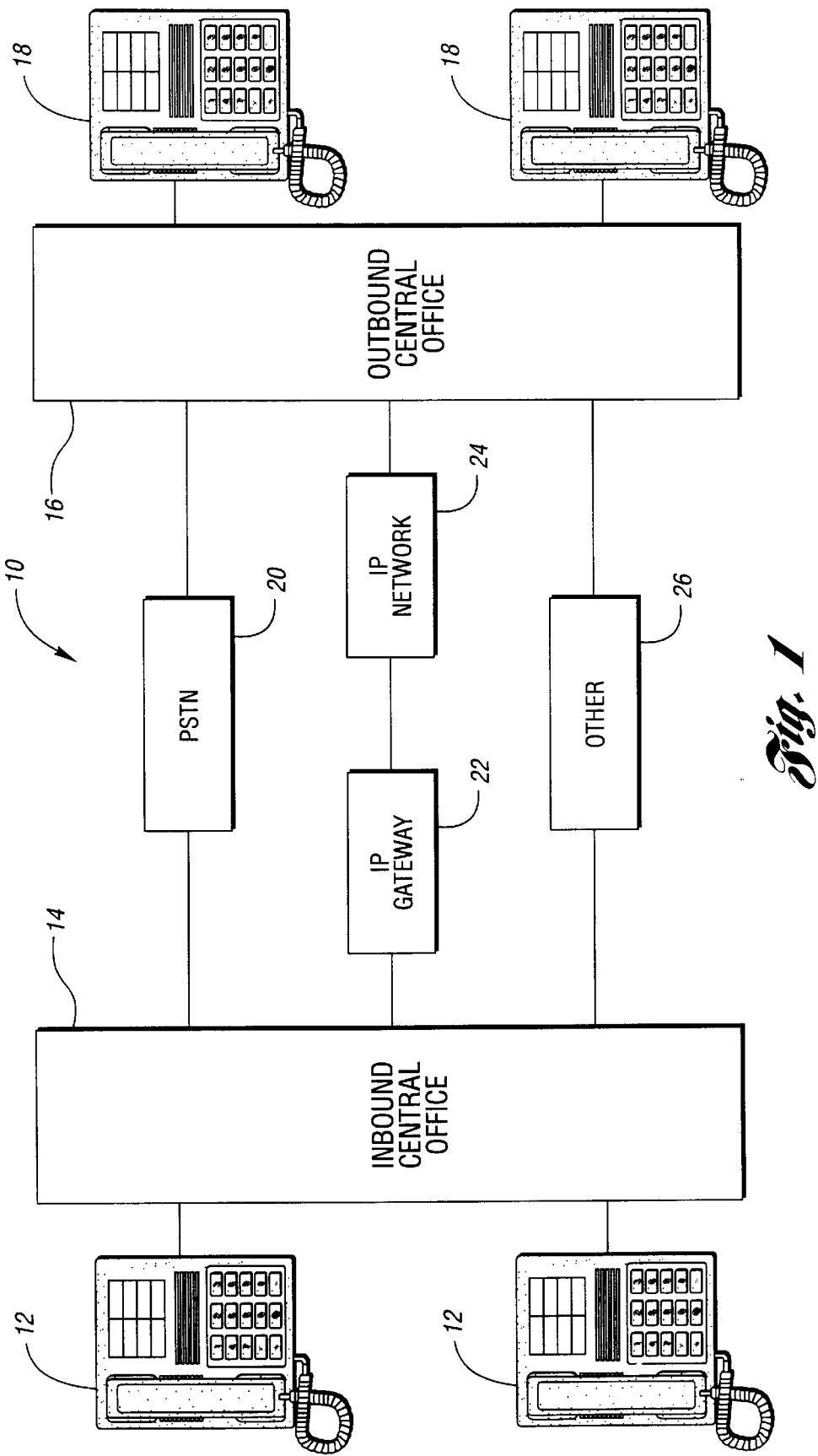
FIG. 1 is a schematic illustrating a telephone system, including telephones of the present invention as call sources.

With reference to FIG. 1, a system for routing calls from an inbound central office to an outbound central office is generally indicated at 10. Call sources such as Customer Premise Equipment (CPE) devices 12 generate incoming calls which may be, for example, Public Switched Telephone Network (PSTN) calls or Internet protocol (IP) calls. Calls from call sources 12 are received by inbound central office 14. Calls are routed from inbound central office 14 to outbound central office 16 as will be further described. Outbound central office 16, in turn, sends the call to a call destination such as CPE devices 18.

The routing method for the call from inbound central office 14 to outbound central office 16 may be any one of a number of different routing methods. For example, a call may be routed through a circuit switched network, such as PSTN 20. Alternatively, a call may be routed through a packet switched network. For example, a call may be processed at IP gateway 22 and routed over IP network 24 to outbound central office 16. Still further, any other network 26, in addition to circuit switched network 20 and IP network 24, may be used to transport a call from inbound central office 14 to outbound central office 16. Of course, PSTN and IP networks are appropriate for use in embodiments of the present invention. However, other networks may be substituted therefor or used in conjunction therewith, as is appreciated by one of ordinary skill in the art.

With reference to FIG. 2, a telephone of the present invention is generally indicated at 30. Telephone 30 is used to designate the appropriate routing method from inbound central office 14 (FIG. 1) to outbound central office 16 (FIG. 1). Telephone 30, as depicted, includes a handset 32 and a base unit 33. Telephone 30 further includes an audible input mechanism which may be a microphone 34 on handset 32, and an audible output mechanism which may be a speaker 36 on handset 32. Of course, telephone 30 may take many forms other than a handset/base unit combination. Further, a microphone and speaker may be enclosed within base unit 33 behind grille 38, if desired, for hands-free telephone operation.

Further, telephone 30 includes a standard telephone keypad 40. Particularly, standard telephone keypad 40 includes numbers 0 through 9, an asterisk (*), and a pound sign (#).

It is to be appreciated that the term "standard telephone keypad" as used herein is meant to encompass existing standard telephone keypads. Thus, the term "standard telephone keypad" is meant to include, at a minimum, a plurality of keys used to designate a call destination (such as numbers 0 through 9). In addition, the "standard telephone keypad" may include additional keys for known phone functions (for example the asterisk and pound symbol keys).

Telephone 30, in addition to standard telephone keypad 40, includes additional keys 44, 46, and 48. The additional keys are used by the user to designate a call routing method for the call. More particularly, a user may press any one of keys 44, 46, and 48 to designate any one of a plurality of call routing methods.

Of course, it is to be appreciated that the additional keys may consist of a single key used to designate a non-default call routing method, or may consist of a plurality of keys used to designate different non-default call routing methods.

In one suitable implementation, the dialing of a phone number on standard telephone keypad 40, without depressing any of the additional keys 44, 46, and 48, results in a call routed over the standard circuit switched network (PSTN 20, FIG. 1). By pressing one of the additional keys, a customer can originate a telephone call that will be made using Internet Telephony. That is, upon pressing a particular one of the additional keys 44, 46, and 48, the user is immediately connected to IP gateway 22 (FIG. 1).

With reference to FIG. 3, a method of the present invention for routing a call is generally indicated at 60. At block 62, the inbound central office listens to a call source for a first signal indicative of a call routing method designation. The first signal is generated by pressing a non-standard key at the call source. For example, any one of non-standard keys 44, 46, and 48 on telephone 30 (FIG. 2) may be pressed to designate a call routing method. At block 66, the inbound central office listens for a second signal indicative of a call destination. The second signal typically takes the form of a pressed sequence of keys from the standard telephone keypad 40 (FIG. 2). At block 68, the call is routed using the routing method designated at block 64.

It is to be appreciated that the present invention has numerous advantages. For example, a set of additional keys allows a user to select from a range of quality of service options. The network would then determine appropriate routing (and billing) for the call. Of course, it is to be appreciated that the exact size and location of the at least one additional keys or buttons on the telephone may vary based on human factors. Further, it is to be appreciated that a telephone made in accordance with the present invention may be completely backward compatible with existing telephone systems. That is, if none of the additional keys are pressed prior to dialing the phone number, the call would be routed in a default routing method, such as through the PSTN. Otherwise, the pressing of one of the additional keys prior to dialing the phone number would select the appropriate call routing technique.

While the best mode for carrying out the invention has been described in detail, those familiar with the art to which this invention relates will recognize various alternatives designs and embodiments for practicing the invention as defined by the following claims.

What is claimed is:

1. A telephone comprising:

an audible input mechanism;

an audible output mechanism; and a keypad for use by a user to press a sequence of keys to initiate a call;

control logic for responding to the pressed sequence of keys by transmitting a signal indicative of call information to an inbound central office, wherein the keypad includes a standard telephone keypad, and wherein the keypad further includes at least one additional key for use by the user to designate a routing method for the call, wherein the routing method designates a network type to be used for routing the call from the inbound central office.

2. The telephone of claim 1 wherein the at least one additional key is labeled with an @.

3. A telephone comprising:

an audible input mechanism;

an audible output mechanism; and a keypad for use by a user to press a sequence of keys to initiate a call;

control logic for responding to the pressed sequence of keys by transmitting a signal indicative of call information to an inbound central office, wherein the keypad includes a standard telephone keypad, and wherein the keypad further includes at least one additional key for use by the user to designate a routing method from the inbound central office for the call, wherein the at least one additional key comprises a single key for designating the routing method from the inbound central office as packet switched routing.

4. The telephone of claim 3 wherein the packet switched routing is Internet protocol.

5. The telephone of claim 1 wherein the at least additional one key comprises a plurality of different keys corresponding to a plurality of different routing methods.

6. The telephone of claim 1 wherein pressing the at least one additional key designates the call routing method as a non-default method, and wherein not pressing the at least one additional key designates the call routing method as a default method.

7. A telephone comprising:

an audible input mechanism;

an audible output mechanism; and a keypad for use by a user to press a sequence of keys to initiate a call;

control logic for responding to the pressed sequence of keys by transmitting a signal indicative of call information to an inbound central office, wherein the keypad includes a standard telephone keypad, and wherein the keypad further includes at least one additional key for use by the user to designate a routing method from the inbound central office for the call, wherein pressing the at least one additional key designates the call routing method from the inbound central office as a non-default method, and wherein not pressing the at least one additional key designates the call routing method from the inbound central office as a default method, and wherein the non-default method is packet switched routing.

8. The telephone of claim 7 wherein the packet switched routing is Internet protocol.

9. A method for routing a call from an inbound central office, the method comprising:

listening to a call source for a first signal indicative of a call routing method designation, the first signal being generated from pressing a non-standard key at the call source, wherein the routing method designates a network type to be used for routing the call from the inbound central office;

upon receiving the first signal, selecting the designated call routing method for the call;

listening for a second signal indicative of a call destination; and upon receiving the second signal, routing the call to the destination using the designated call routing method.

10. A method for routing a call from an inbound central office, the method comprising:

listening to a call source for a first signal indicative of a call routing method designation, the first signal being generated from pressing a non-standard key at the call source;

upon receiving the first signal, selecting the designated call routing method for the call;

listening for a second signal indicative of a call destination; and upon receiving the second signal, routing the call from the inbound central office to the destination using the designated call routing method, wherein pressing the non-standard key at the call source designates the call routing method as packet switched routing.

11. The method of claim 10 wherein the packet switched routing is Internet protocol.

12. A customer premise equipment device comprising:

a keypad including a key for use by a user to initiate a call, wherein pressing the key designates a call routing method, wherein the routing method designates a network type to be used for routing the call from the inbound central office; and control logic responsive to the pressing of the key, the control logic responding by transmitting a signal indicative of call information to an inbound central office, the call information including the designated routing method.

13. The device of claim 12 wherein the key is labeled with an @.

14. A customer premise equipment device comprising:

a keypad including a key for use by a user to initiate a call, wherein pressing the key designates a call routing method;

control logic responsive to the pressing of the key, the control logic responding by transmitting a signal indicative of call information to an inbound central office, the call information including the designated routing method, wherein pressing the key designates the call routing method as packet switched routing.

15. The device of claim 14 wherein the packet switched routing is Internet protocol.

16. The device of claim 12 wherein the keypad includes a plurality of different keys corresponding to a plurality of different routing methods.

17. The device of claim 12 wherein pressing the key designates the call routing method as a non-default method, and wherein not pressing the key designates the call routing method as a default method.

18. A customer premise equipment device comprising:

a keypad including a key for use by a user to initiate a call, wherein pressing the key designates a call routing method; and control logic responsive to the pressing of the key, the control logic responding by transmitting a signal indicative of call information to an inbound central office, the call information including the designated routing method, wherein pressing the key designates the call routing method as a non-default method, and wherein not pressing the key designates the call routing method as a default method, and wherein the non-default method is packet switched routing.

19. The device of claim 18 wherein the packet switched routing is Internet protocol.

* * * * *